Patented June 16, 1942

2,286,420

UNITED STATES PATENT OFFICE 2,286,420

PROCESS OF MANUFACTURING PORTLAND CEMENT

Charles R. Jackson, Okay, Ark., assignor to Oliver United Filters Incorporated, San Francisco, Calif., a corporation of Nevada No Drawing. Application June 19, 1939, Serial No. 279,946

2 Claims. (Cl. 210—62)

This invention relates in general to the wet process of manufacturing hydraulic cement such as Portland cement, and more particularly to a method of dewatering the cement slurry preparatory to burning the cement-making materials.

Hydraulic cements are made according to specification, and when made by the wet process the cement slurry is preferably dewatered prior to passing the material through the kilns. This dewatering step is ordinarily accomplished by continuous filters, but in order to obtain sufficient filtration capacity, it has been found necessary to resort to the use of filter aids or coagulating agents such as lime and flue dust from the stacks of a cement plant. While the addition of these reagents increases the filterability of the slurry, it at the same time alters the lime ratio of the final product, and since the final product must comply with definite specifications, the slurry must be corrected in order to compensate for the lime added by way of filter aids or coagulating agents. Furthermore, it has been found that flue dust corrodes the equipment used.

In general, the object of this invention is the filtration of cement slurry in the presence of a non-corrosive filter aid or coagulating agent which greatly increases the filtration rate of the slurry without altering the final composition of the resulting cement.

As a result of considerable development work, I have found that this objective may be realized by the introduction of finished cement into the cement-making materials at any point in the cycle of operation prior to the actual step of filtration or by the introduction of hydraulic cement clinker to the raw cement-making materials at the grinding mills. While the optimum quantity of finished cement which should be added to produce the best results varies with the nature of the cement-making materials at hand, I have found that very good results may be obtained by the addition to the cement slurry of from $\frac{1}{10}$ pound to 1 pound of finished cement to every 100 pounds of dry solids contained in the cement slurry. Preferably this addition is made just prior to the step of filtration.

More specifically, I have found that in filtering cement slurries produced by Arkansas Portland Cement Company at Okay, Arkansas, the addition of from 0.24% to 0.5% of finished cement to the cement slurry would increase the filtration rate of the slurry from fifty to one hundred percent. In doing this, the slurries were maintained at a temperature of from 96° to 105° F. Although the percentage of finished cement which should be used to obtain the highest rate of filtration without materially increasing the moisture content of the resulting cake depends upon the character of the materials from which the slurry is formed, the optimum percentage may be readily determined by test runs.

Since the addition of finished cement as a filter aid or coagulating agent in no way varies the final composition of the resulting cement, it is not necessary to make the corrections which are required when either lime or flue dust is used, and the use of an agent corrosive to the equipment used is avoided.

Obviously it is preferable that the specifications of the finished cement added as a filter aid should conform substantially to the specifications to which the slurry being filtered must conform after being burned and ground.

When the cement is added to the raw cement-making materials in the form of hydraulic cement clinker, the ratio of the clinker to the raw materials is substantially the same as the ratio which would be required in adding finished cement to the cement slurry.

I claim:

1. The method of dewatering hydraulic cement-making materials preparatory to burning them, comprising filtering said materials in the presence of a small quantity of finished cement, not in excess of 1% calculated on a dry weight basis.

2. The method of dewatering hydraulic cement-making materials preparatory to burning them, comprising filtering said materials in the presence of substantially 0.5% of finished cement, calculated on a dry weight basis.

CHARLES R. JACKSON.